(12) United States Patent  (10) Patent No.: US 7,766,117 B2
Saito et al.  (45) Date of Patent: Aug. 3, 2010

(54) MOTOR-DRIVEN SEATBELT APPARATUS

(75) Inventors: Takuhiro Saito, Aichi-ken (JP);
Teruhiko Koide, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 404 days.

(21) Appl. No.: 11/679,670

(22) Filed: Feb. 27, 2007

(65) Prior Publication Data
US 2007/0199758 A1  Aug. 30, 2007

(30) Foreign Application Priority Data

Feb. 27, 2006 (JP) ............................. 2006-050596
Feb. 23, 2007 (JP) ............................. 2007-044130

(51) Int. Cl.
*B60R 21/00* (2006.01)
(52) U.S. Cl. ..................... 180/268; 242/374
(58) Field of Classification Search .............. 180/268; 242/374, 390.8, 390.9; 297/480; 280/808, 280/807
See application file for complete search history.

(56) References Cited

U.S. PATENT DOCUMENTS 4,655,312 A * 4/1987 Frantom et al. ............. 180/268
6,666,292 B2 * 12/2003 Takagi et al. ............... 180/274
6,767,031 B2 * 7/2004 Yamamoto .................. 280/806
2005/0230174 A1 * 10/2005 Fukuda ....................... 180/268

FOREIGN PATENT DOCUMENTS

JP  11-227567 A  8/1999
JP  2005-306091 A  11/2005

* cited by examiner

*Primary Examiner*—Paul N Dickson
*Assistant Examiner*—Robert A Coker
(74) *Attorney, Agent, or Firm*—Roberts Mlotkowski Safran & Cole, P.C.; Thomas W. Cole

(57) ABSTRACT

A motor-driven seatbelt apparatus which enables easy re-restraining of a webbing even when an occupant releases the webbing temporarily from a restrained state. A control device senses the vehicle velocity with a vehicle-velocity sensor. When the vehicle velocity is a predetermined value or lower, the control device drives a motor to rotate a winding shaft, so that the webbing is wound into a completely wound state. When the vehicle is traveling at a vehicle velocity exceeding the predetermined value, the storing and winding operation of the winding shaft by the control device or the motor is not performed. Therefore, the occupant who temporarily released the webbing and finished an action such as to take out a small article in the cabin can re-restrain the webbing immediately thereafter.

11 Claims, 4 Drawing Sheets

MOTOR-DRIVEN SEATBELT APPARATUS

CROSS-REFERENCE TO RELATED APPLICATION

This application claims priority under 35 USC 119 from Japanese Patent Application, Nos. 2006-50596 and 2007-044130, the disclosures of which are incorporated by reference herein.

BACKGROUND OF THE INVENTION

1. Field of the Invention

The present invention relates to a motor-driven seatbelt apparatus in which a seatbelt webbing is wound by a drive force of a motor.

2. Description of the Related Art

A seatbelt apparatus in which a webbing is wound by a drive force of a motor when an occupant of a vehicle releases a seatbelt webbing from a restrained state is proposed in Japanese Patent Application Laid-open No. 11-227567.

In this seatbelt apparatus, when the occupant releases the webbing from the restrained state, the webbing is wound by the drive force of the motor, then the motor is stopped, and then the webbing is further wound after an elapse of a predetermined period, so that the restraining operation of the webbing is facilitated even when the webbing is re-restrained by the occupant.

However, in this seatbelt apparatus, even though the occupant does not have a will to release the webbing from the restrained state, the motor is driven when a tongue is released from a buckle and hence the webbing is wound. Therefore, even when the webbing is temporarily released for taking a small article from a glove box in a cabin, the webbing is wound in a storing direction by the drive force of the motor. Consequently, the operation to re-restrain the webbing which is once released temporarily is hindered.

SUMMARY OF THE INVENTION

In view of such circumstances, a motor-driven seatbelt apparatus which allows an occupant to re-restrain the webbing easily after he/she has released the webbing temporarily from a restrained state is provided A first aspect of the present invention is a motor-driven seatbelt apparatus comprising a webbing to be restrained around an occupant; a motor that winds the webbing; and a controller that performs control to not wind the webbing when the occupant releases the webbing from the restrained state while the vehicle is traveling at a velocity exceeding the predetermined velocity.

According to the aspects described above, when the occupant releases the webbing from the restrained state while the vehicle is traveling at a velocity exceeding the predetermined velocity, the webbing is not released because of getting off the vehicle, but temporarily released for allowing a large movement of the upper body of the occupant in a cabin. In this case, the webbing is not wound, and hence the occupant can re-restrain the webbing easily after having finished the operation such as handling a small article in a glove box with a large In the above aspect, the controller may perform control to drive the motor to wind and store the webbing when the occupant releases the webbing from a restrained state while the vehicle is traveling at the predetermined velocity or lower.

According to the aspect described above, when the occupant releases the webbing from the restrained state while the vehicle is traveling at the first predetermined velocity or lower, it is not a temporary release of the driver's seat webbing from the restrained state, but a release after the vehicle is stopped or when the vehicle is about to stop for the purpose of getting off the vehicle. Therefore, the controller controls the motor to wind and store the webbing.

The predetermined velocity or lower includes both the case in which the vehicle is traveling at an extremely low velocity, and a case in which the vehicle is stopped.

In the above aspect, the controller may perform control to stop the motor when a tension of the webbing increases and the rotation of the motor is locked in the winding operation for storing the webbing.

According to the aspect described above, when the motor winds and stores the webbing, the motor is continuously driven until the tension of the webbing increases and the rotation of the motor is locked. The locking of the rotation of the motor arises in an entirely wound state in which no unwound amount of the webbing is left, or in a case in which the winding operation of the webbing is hindered because the webbing in the course of being wound is blocked by, for example, the occupant seat. Therefore, in the case in which the webbing is blocked by a vehicle part or the like while being wound, the motor is stopped and the winding of the webbing is stopped.

In the aspect described above, it is also possible to configure the controller such that it performs control to drive the motor to wind and store the webbing when a predetermined period has elapsed after the driving of the motor is stopped.

According to the aspect described above, when the winding operation of the webbing is interrupted, the winding operation of the webbing can be restarted by driving the motor after the predetermined period has elapsed.

In the aspect described above, it is also possible to configure the controller such that it performs control to drive the motor to wind and store the webbing when the velocity of the vehicle is decreased to the predetermined velocity or lower in a case in which the occupant releases the webbing from the restrained state while the vehicle is traveling at a velocity exceeding the predetermined velocity.

According to the aspect described above, the winding operation of the webbing is not performed when the occupant releases the webbing from the restrained state while the vehicle is traveling at a velocity exceeding the predetermined velocity, but when the velocity of the vehicle is decreased to the predetermined velocity or lower, the controller performs control to drive the motor for storing the webbing to make ready for, for example, the occupant's getting off the vehicle.

In the aspect described above, the controller may be configured such that it performs control to drive the motor to wind and store the webbing when it is detected that the occupant has left the seat after the motor is stopped.

According to the aspect described above, since the controller performs control to drive the motor for storing the webbing when the fact that the occupant leaves the seat is sensed when the winding operation of the webbing is interrupted, the webbing is not left lying in the cabin after the occupant has left the vehicle.

A second aspect of the invention is a motor-driven seatbelt apparatus comprising a webbing to be restrained around an occupant; a motor that winds the webbing; and a controller that performs control to not wind the webbing when the occupant releases the webbing from the restrained state while the vehicle is traveling.

According to the aspects described above, when the occupant releases the webbing from the restrained state, that is, for example, the webbing is temporarily released for allowing a large movement of the upper body of the occupant in a cabin.

In this case, the webbing is not wound, and hence the occupant can re-restrain the webbing easily after having finished the operation such as handling a small article in a glove box with a large A third aspect of the invention is a motor-driven seatbelt apparatus comprising a driver's seat webbing to be restrained around a driver; a driver's seat motor that winds the driver's seat webbing; a passenger's seat webbing to be restrained around a passenger; a passenger's seat motor that winds the passenger's seat webbing; and a controller that performs control to not wind the driver's seat webbing when the driver releases the driver's seat webbing from the restrained state while the vehicle is traveling at a velocity exceeding a first predetermined velocity, and performs control to not wind the passenger's seat webbing when the passenger releases the passenger's seat webbing from the restrained state while the vehicle is traveling at a velocity exceeding a second predetermined velocity that is set to be equal to or faster than the first predetermined velocity.

According to the aspect described above, when the driver releases the driver's seat webbing from the restrained state while the vehicle is traveling at a velocity exceeding the first predetermine velocity, it is not the release for getting off the vehicle, but the temporary release for allowing a large movement of the upper body of the driver in a cabin. In this case, the controller does not drive the driver's seat motor so that the driver's seat webbing is not wound, and hence the driver can re-restrain the driver's seat webbing easily after having finished the operation such as handling a small article in a glove box with a large movement of the upper half body.

Additionally, when the passenger releases the passenger's seat webbing from the restrained state while the vehicle is traveling at a velocity exceeding the second predetermine velocity that is set to be equal to or faster than the first predetermine velocity, the controller does not drive the passenger's seat motor so that the passenger's seat webbing is not wound, and hence the passenger can re-restrain the seat webbing easily after having finished the operation such as turning the body backward with a large movement of the upper half body.

A fourth aspect of the invention is a motor-driven seatbelt apparatus including a driver's seat webbing to be restrained around a driver; a driver's seat motor that winds the driver's seat webbing; and a controller that performs control to not drive the driver's seat motor so as not to wind and store the driver's seat webbing when the driver releases the driver's seat webbing from a restrained state while the vehicle is traveling.

According to the aspect described above, when the driver releases the driver's seat webbing from the restrained state, it is not the release for getting off the vehicle but the temporary release for allowing a large movement of the upper body of the driver in a cabin. In this case, the controller does not drive the driver's seat motor so that the driver's seat webbing is not wound, and hence the driver can re-restrain the driver's seat webbing easily after having finished the operation such as handling a small article in a glove box with a large movement of the upper half body.

In the above aspect, the apparatus may further include a passenger's seat webbing to be restrained around a passenger; and a passenger's seat motor that winds the passenger's seat webbing, and the controller may perform control to drive the passenger's seat motor to wind and store the passenger's seat webbing when the passenger releases the passenger's seat webbing from the restrained state while the vehicle is traveling.

According to the aspect described above, since the winding operation of the passenger's seat webbing is performed irrespective of the vehicle velocity, when the passenger performs the action to move to another seat, the webbing which is released from the restrained state is not left lying in the cabin. The webbing is also wound when the webbing is released from the restrained state for the purpose of getting off the vehicle.

According to the aspects described above, an occupant can re-restrain the webbing easily after he/she has released the webbing temporarily from a restrained state.

BRIEF DESCRIPTION OF THE DRAWINGS

Embodiments of the present invention will be described in detail based on the following figures, wherein.

DETAILED DESCRIPTION OF THE INVENTION

Figure 1:
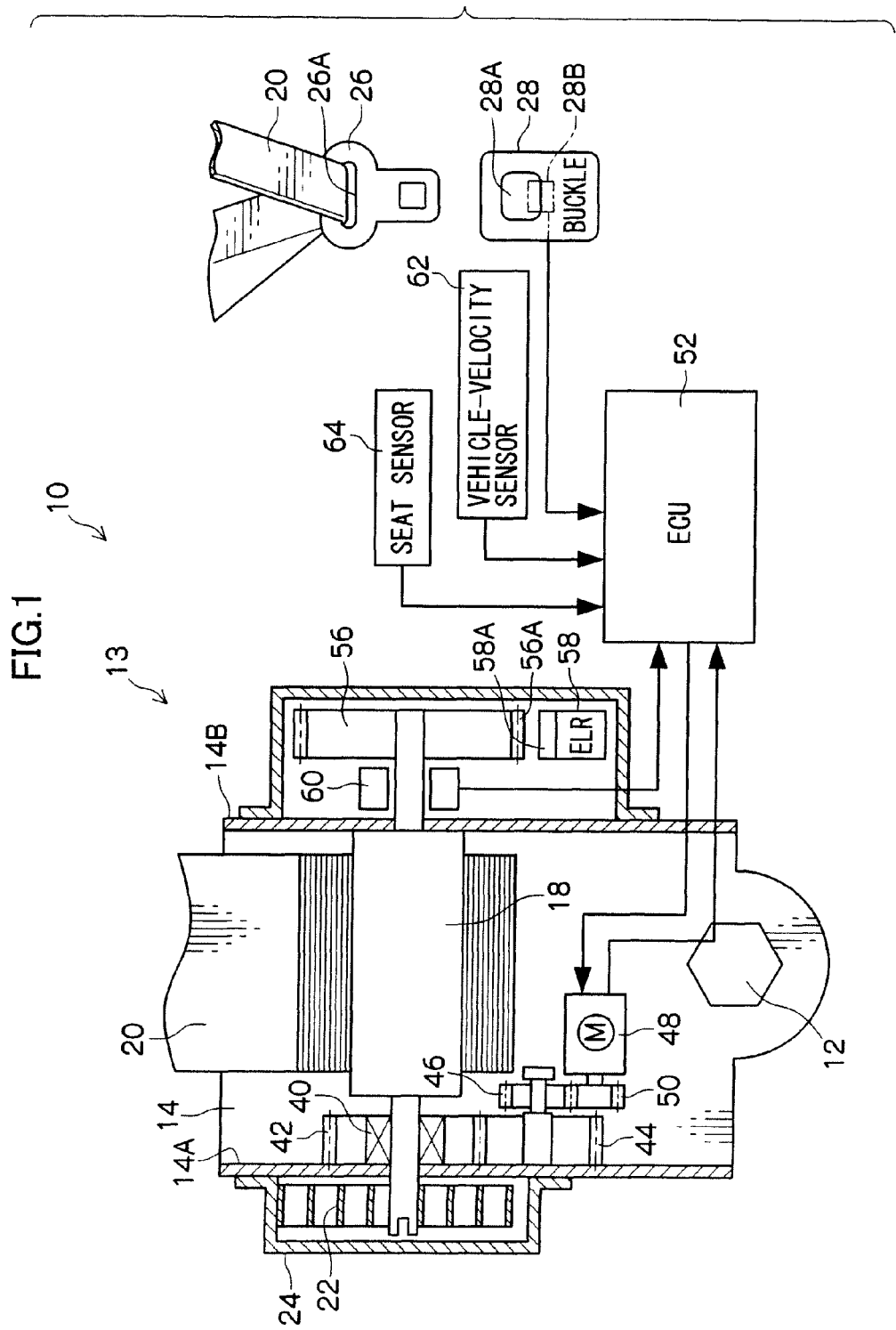
FIG. 1 is a schematic drawing showing an exemplary embodiment of a motor-driven seatbelt apparatus of the invention.
Figure 2:
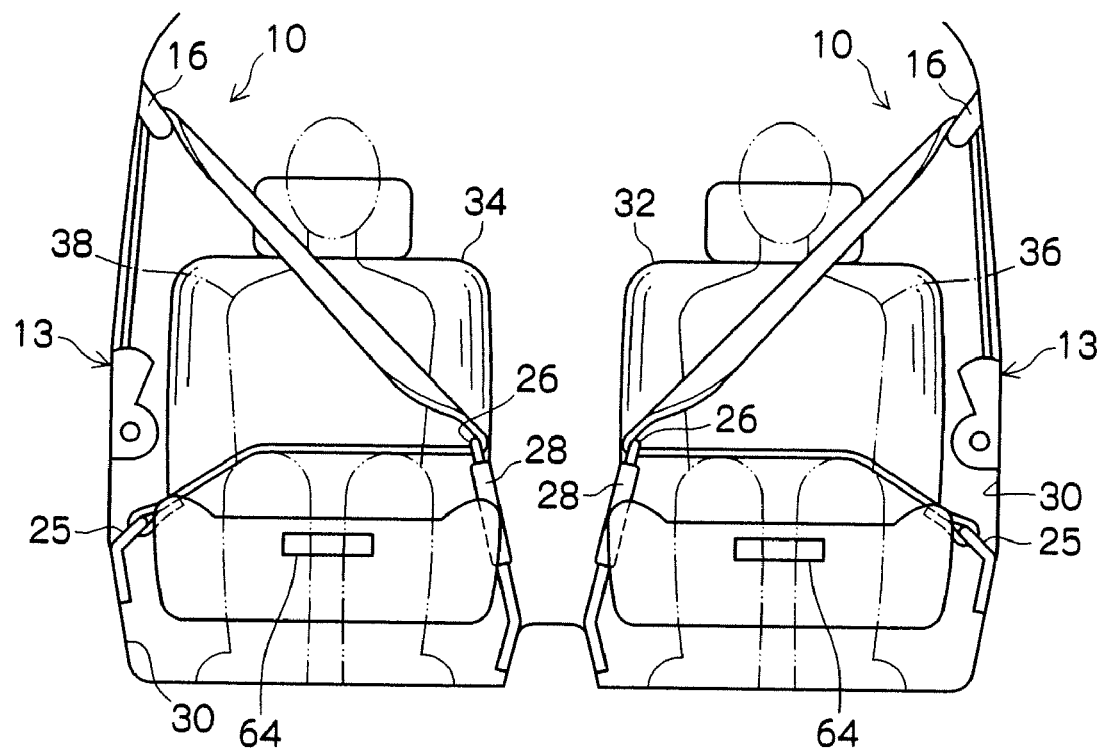
FIG. 2 is a vertical cross-sectional drawing showing a vehicle to which the exemplary embodiment of the invention is applied in which the vehicle is viewed from the front side.

FIGS. 1 and 2 show a motor-driven seatbelt apparatus 10 according to an exemplary embodiment of the invention. The seatbelt apparatus 10 is provided at a driver's seat 32 and a passenger's seat 34 respectively in lateral symmetry as shown in FIG. 2.

The seatbelt apparatus 10 includes a webbing winding device 13 shown in FIG. 1, and a frame 14 which is attached to a vehicle body with a bolt 12 includes side walls 14A and 14B bent at right angle and extending in parallel with each other.

The side walls 14A and 14B support a winding shaft 18. A webbing 20 is wound around the winding shaft 18 in layers.

The webbing 20 pulled out from the winding shaft 18 is turned around at a shoulder anchor 16 attached to a side wall 30 of the vehicle body, is passed through an insertion hole 26A (FIG. 1) of a tongue plate 26, and is engaged with an anchor plate 25 attached to the side wall 30 of the vehicle body as shown in FIG. 2. A buckle device 28 is provided at substantially the center of the vehicle so as to extend upright for engaging the tongue plate 26. Accordingly, a driver 36 seated on the driver's seat 32 and a passenger 38 seated on the passenger's seat 34 are each able to restrain the webbing 20 by engaging the tongue plate 26 with the buckle device 28. The webbing 20 includes a lap webbing between the anchor plate 25 and the tongue plate 26, and a shoulder webbing between the tongue plate 26 and the shoulder anchor 16. The occupant can separate the tongue plate 26 from the buckle device 28 by pressing a release button 28A (FIG. 1) on the buckle device 28. A state in which the tongue plate 26 is engaged with the buckle device 28 and a state in which the tongue plate 26 is separated from the buckle device 28 are sensed by a switch 28B provided in the buckle device 28, and signals are sent to a control device 52.

An inner end of a power spring 22 is attached to an end of the winding shaft 18 projected from the side wall 14A of the frame 14 of the webbing winding device 13, and an outer end of the power spring 22 is engaged with the cover 24 mounted to the side wall 14A. The power spring 22 transmits a slight winding force to the winding shaft 18.

A rotational force of the power spring 22 that urges the winding shaft 18 in the winding direction serves as an urging force that causes the webbing 20 to be attached lightly to the occupant when the occupants 36 and 38 restrain the webbing 20, but is insufficient for causing the winding device 13 to wind the pulled out portion of the webbing 20 entirely when the occupant releases the webbing 20 from the restrained state.

In the vicinity of the side wall 14A, a gear 42 is attached to the winding shaft 18 via a clutch 40. The gear 42 engages a small gear 44, and a small gear 46 fixed coaxially with the small gear 44 engages an output shaft gear 50 of a motor 48. The motor 48 is connected to the control device 52, and the rotation thereof is controlled by the control device 52. The motor 48 is supplied with an electric power from the vehicle on the basis of signals from the control device 52, whereby a large rotational force is generated to provide a webbing winding force to the winding shaft 18 via the gears 50, 46, 44, and 42. When the motor 48 is rotated, the clutch 40 transmits the rotational force of the motor to the winding shaft 18, and when the rotation of the motor 48 is stopped, connection between the winding shaft 18 and the gear 42 is disconnected, so that the winding shaft 18 can be rotated freely. Even in the state in which the electric power from the vehicle is supplied to the motor 48, the motor 48 cannot rotate when an intermediate portion of the webbing 20 is blocked by the driver's seat 32 or the passenger's seat 34 during winding operation of the webbing 20 since the winding movement of the webbing 20 is hindered thereby. In this case, a lock current is generated in the motor 48, so that this state is sensed by the control device 52.

In the winding device 13, a lock ring 56 is secured to the other end of the winding shaft 18 projecting outward from the frame side wall 14B. A latchet tooth 56A is formed on the outer periphery of the lock ring 56 facing to an inertia lock device 58. The inertia lock device 58 is attached to the side wall 14B, so as to sense sudden deceleration of the vehicle and causes the lock claw 58A to engage the latchet tooth 56A of the lock ring 56, thereby stopping the rotation of the winding shaft 18 to pull out the webbing when the vehicle is suddenly decelerated.

A wound-complete sensor 60 is attached to the outside of the frame side wall 14B so as to face the winding shaft 18. The wound-complete sensor 60 is adapted to sense a state in which the winding shaft 18 has wound the pulled out portion of the webbing 20 entirely, and sends a detected signal to the control device 52. For example, the wound-complete sensor 60 may be a number-of-rotation sensing device that detects the number of rotation of the winding shaft 18. It is also possible to configure the control device 52 such that it determines the completely wound state of the webbing 20 when the lock current of the motor 48 is generated instead of the provision of the wound-complete sensor 60.

The control device 52 detects signals from a vehicle-velocity sensor 62 and a seat sensor 64. The vehicle-velocity sensor 62 is adapted to sense a state in which the vehicle velocity is the predetermined velocity or lower (in this exemplary embodiment, the state in which the vehicle velocity is 3 km/h or lower is sensed). The vehicle-velocity sensor 62 also senses a state in which the vehicle is stopped as the vehicle velocity is the predetermined velocity or lower.

The seat sensors 64 are mounted to the driver's seat 32 and the passenger's seat 34 respectively, and sense the seated state of the driver 36 and the passenger 38, respectively.

When the driver 36 releases the tongue plate 26 from the buckle device 28 during travel, the control device 52 does not drive the motor 48 when the vehicle velocity sensed by the vehicle-velocity sensor 62 exceeds the predetermined velocity, on the other hand, the control device 52 drives the motor 48 so as to wind and store the webbing 20 when the vehicle velocity is the predetermined velocity or lower. When the webbing 20 is not completely wound because the webbing 20 is blocked by the driver's seat 32 or the passenger's seat 34 in the course of the winding and storage, the rotation of the motor 48 is locked due to a resistance force applied to the webbing 20. The motor 48 is driven again when a predetermined period has elapsed after the motor 48 is stopped to bring the webbing 20 into an entirely wound state. When the passenger 38 releases the webbing 20 from the restrained state the motor 48 is driven to wind and store the webbing 20 irrespective of the vehicle velocity.

An operation of this exemplary embodiment will be described.

After having seated on the driver's seat 32 and the passenger's seat 34, the driver 36 and the passenger 38 can bring the webbing 20 into the restrained state as a three-point type seatbelt by engaging the tongue plate 26 with the buckle device 28 (FIG. 2).

Figure 3:
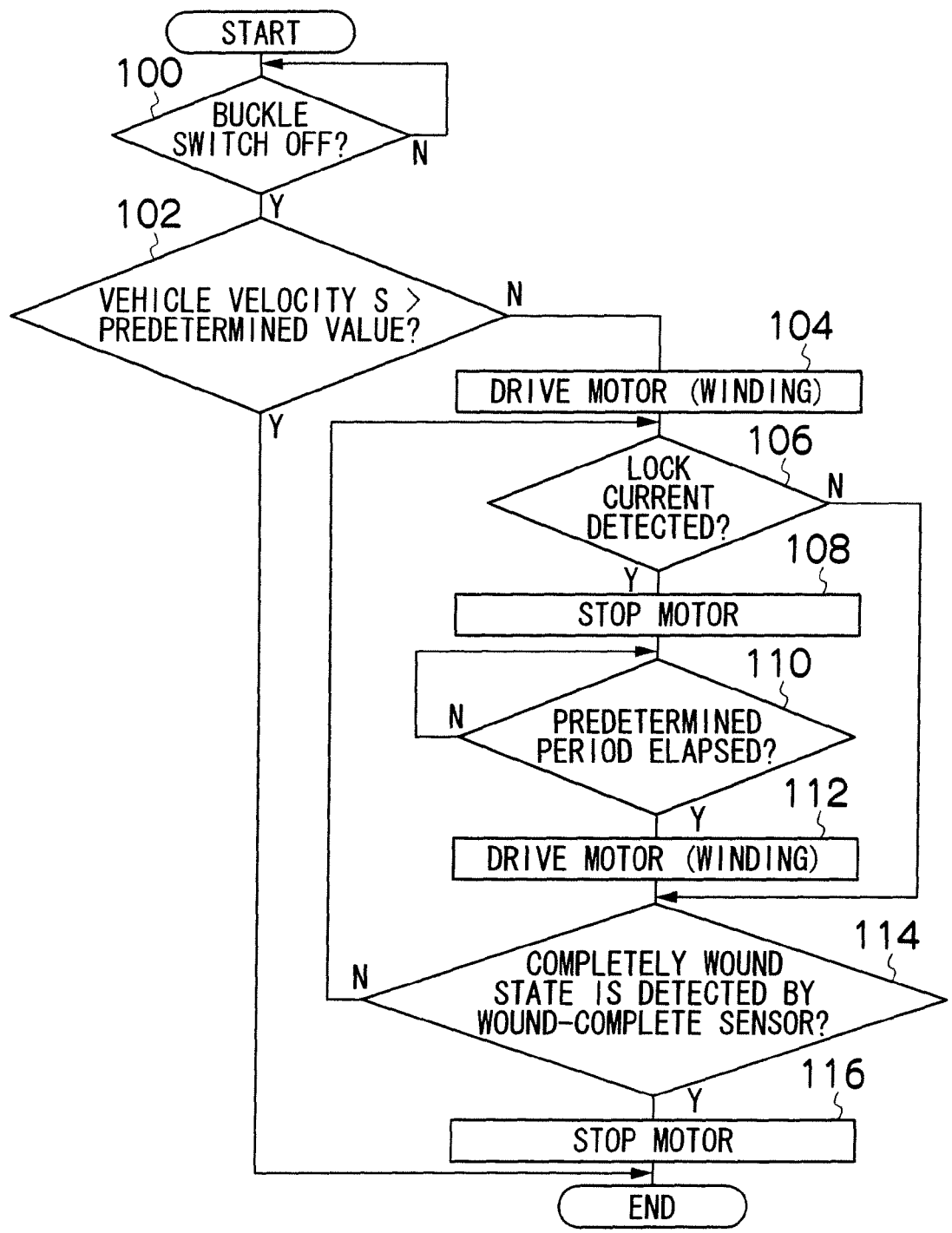
FIG. 3 is a flowchart showing motor driving control in a winding device at a driver's seat.

FIG. 3 shows a motor control flow of the winding device 13 provided at the driver's seat 32.

There is a case of pressing the release button 28A of the buckle device 28 to release the webbing 20 from the restrained state temporarily when the driver 36 moves the upper half body for taking a small article or the like stored in the glove box during travel. Pressing operation of the release button 28A of the buckle device 28 done by the driver 36 is sensed by the control device 52 as an OFF state of the buckle switch 28B (Step 100). Then, the control device 52 determines whether or not the vehicle velocity exceeds the predetermined value (Step 102). When the vehicle velocity is larger than the predetermined value (larger than 3 km/h in this exemplary embodiment), the control device 52 does not drive the motor 48. Therefore, the webbing 20 which is released from the restrained state temporarily is not wound around the winding shaft 18, and remains in a sagged state. Therefore, the driver 36 can perform a required action such as taking out the small article in the glove box without inconvenience, and can easily engage the tongue plate 26 with the buckle device 28 again. Accordingly, the state in which the webbing 20 is restrained is achieved again, and the procedure goes back to Step 100.

Alternatively, when it is determined that the vehicle velocity is the predetermined velocity or lower in Step 102, the motor 48 is rotated in the webbing winding direction (Step 104). Accordingly, the winding shaft 18 receives the rotational force with the motor 48 via the gear 42, thereby winding the webbing 20. When the webbing 20 cannot be wound entirely as the webbing 20 is blocked temporarily with a part of the driver's seat 32 in the course of being wound, the winding rotation of the winding shaft 18 stops due to a resistance force generated at the webbing 20. The motor 48 is locked from rotating and the lock current is generated in the motor 48. When this state is sensed (Step 106), the control device 52 stops the motor 48 (Step 108).

The control device 52 drives the motor 48 again in the webbing winding direction (Step 112) after an elapse of the predetermined period (Step 110). The entire amount of the webbing 20 is wound by the winding shaft 18 in a state in which the temporary block by the driver's seat 32 is released.

The wound-complete sensor 60 senses the completely wound state of the winding shaft 18 (Step 114) and stops the motor (Step 116).

In a case in which the webbing 20 is not blocked by the part in the cabin when the motor 48 is driven in Step 104 and the webbing 20 is wound, the procedure goes from Step 106 to Step 114, where the wound-complete sensor 60 senses the completely wound state and the motor 48 is stopped (Step 116). When the completely wound state is not sensed in Step 114 even after the winding operation by the motor, the procedure goes back to Step 106, where the same operation is repeated.

In this manner, when the driver 36 releases the webbing 20 from the restrained state while the vehicle is stopped or is traveling at an extremely low velocity, it is understood as a case in which the webbing 20 is to be released for the purpose of the driver 36's getting off the vehicle. Therefore, the webbing 20 is wound by the winding shaft 18 to the completely wound state by the drive force of the motor 48, and hence the webbing 20 does not remain in the cabin.

Figure 4:
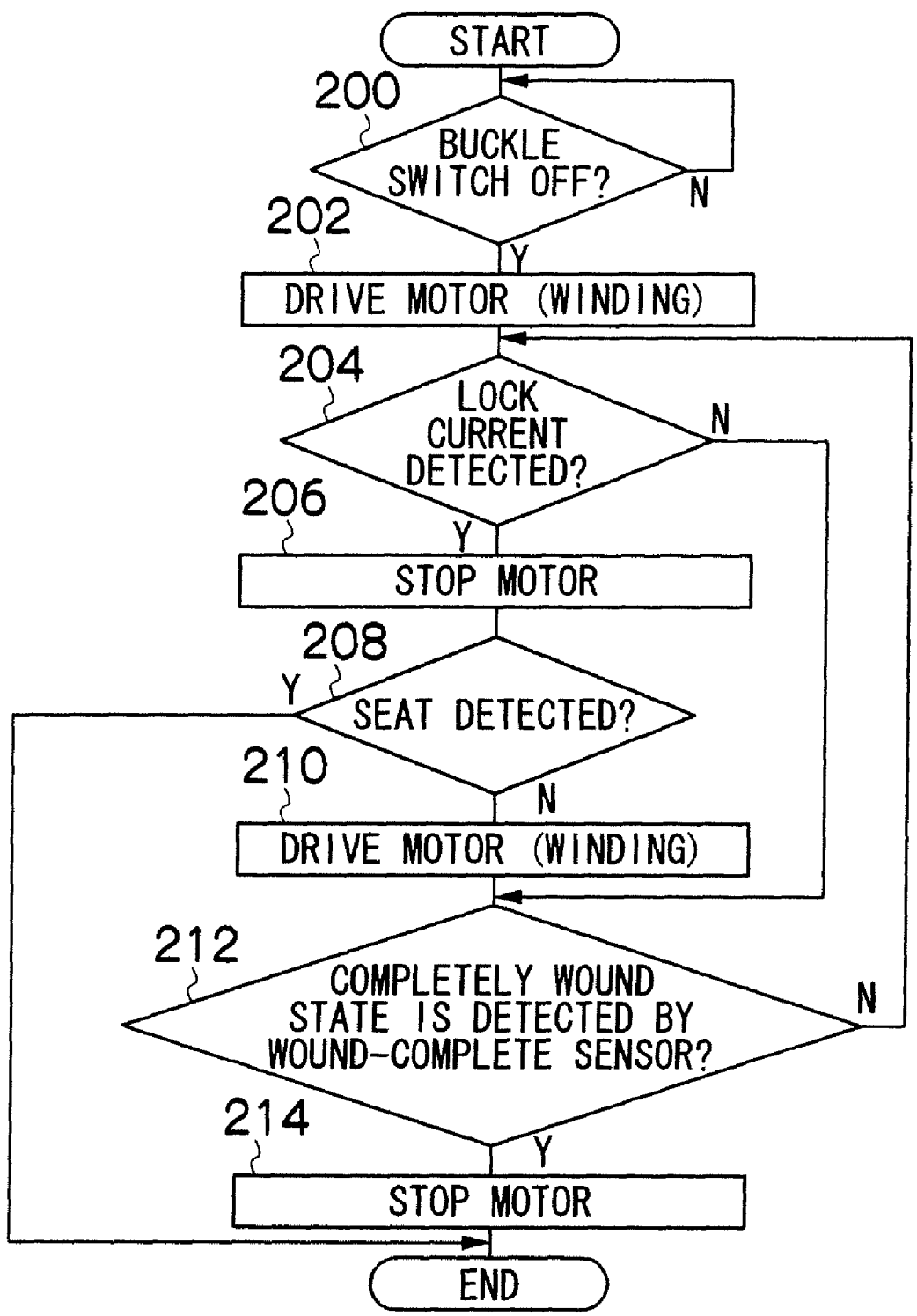
FIG. 4 is a flowchart showing motor drive control in a winding device at a passenger's seat.

FIG. 4 shows a motor control flow of the seatbelt device 10 to be restrained around the passenger 38.

Unlike the case of the driver 36, since the glove box is located just in front of the passenger 38, the passenger 38 needs not to release the webbing 20 from the restrained state when taking out a small article or the like from the glove box in the cabin, and the passenger 38 can take out the article with the webbing 20 restrained. In most cases, the passenger 38 releases the webbing 20 from the restrained state in order to get off the vehicle when the vehicle is stopped or is traveling at a extremely low velocity or to move to another seat while the vehicle is traveling.

When the passenger 38 presses the release button 28A of the buckle device 28 to pull out the tongue plate 26 from the buckle device 28, the buckle switch 28B senses it and transmits it to the control device 52 (Step 200). Here, the control device 52 drives the motor 48 to rotate the winding shaft 18 in the webbing winding direction and wind the webbing 20 (Step 202).

Since the motor 48 rotates the winding shaft 18, the webbing 20 is wound around the winding shaft 18, and when the webbing 20 is temporarily blocked by the passenger seat 34 or the like in the course of the winding operation, the rotation of the motor 48 is stopped, whereby the lock current is sensed (Step 204). When the lock current is sensed, the controller 52 stops rotation of the motor 48 (Step 206).

Subsequently, when the passenger leaves the passenger's seat 34 and get off the vehicle, it is sensed by the seat sensor 64 (Step 208), the control device 52 detects it and drives the motor 48 in the webbing winding direction to wind the webbing 20 around the winding shaft 18 (Step 210). A state in which the pulled out webbing 20 is wound around the winding shaft 18 entirely by the webbing winding operation is sensed by the wound-complete sensor 60 (Step 212), and the rotation of the motor 48 is stopped (Step 214).

In a state in which the winding shaft 18 is driven by the motor 48 and the webbing 20 is being wound, when the webbing 20 is entirely wound around the winding shaft 18 smoothly without being blocked by the passenger's seat 34 or the like, the lock current is not generated in the motor 48, the procedure goes from Step 202 to Step 212, where the motor 48 is stopped in the completely wound state (Step 214). In the case where the winding operation of the winding shaft 18 by the motor 48 is stopped in an incompletely wound state because a part of the webbing 20 is blocked by the passenger's seat 34 (caught by the vehicle part) while the webbing 20 is wound around the winding shaft 18 (Step 206), and the passenger 38 does not get off the vehicle but stays seated on the passenger's seat 34, there is a possibility that the passenger 38 pulls out the webbing 20 and restrain it again thereafter. Therefore, the subsequent motor driving operation (Step 210) is not performed and the flow is ended in a state in which the winding operation of the webbing 20 is stopped.

In the above-described example, the motor drive control flow for the winding device 13 is different between the driver's seat 32 and the passenger's seat 34 as shown in FIGS. 3 and 4. However, the motor drive control flow for the driver's seat in FIG. 3 may be applied to the winding device 13 at the passenger's seat 34.

When the motor drive control flow for the driver's seat in FIG. 3 is applied to control both of the motors 48 of winding devices 13 at the driver's seat 32 and the passenger's seat 34, the predetermined velocity (a second predetermined velocity recited in claim 8) that is determined in Step 102 of the motor drive control flow for the passenger's seat 34 may set to be equal to or faster than the predetermined velocity (a first predetermined velocity recited in claim 8) that is determined in Step 102 of the motor drive control flow for the driver's seat 34.

In FIG. 3, when the occupant releases the webbing 20 from the restrained state during travel at a velocity exceeding the predetermined value, the motor 48 is not driven and the re-restraining of the webbing 20 by the occupant is waited. However, when the vehicle velocity is decreased to the predetermined value or lower without re-restraining of the webbing 20 by the occupant, it is also possible to perform a series of webbing 20 winding operation in Steps 104 to 116. In the motor control of the winding device 13 at the passenger's seat 34 in FIG. 4, in the state in which the lock current is sensed in Step 204, it may be determined as the state in which the passenger 38 releases the webbing 20 from the restrained state temporarily and then pulls out the webbing 20 again for re-restraining the webbing 20. Therefore, it is also possible to stop the motor 48 in Step 206 after the lock current of the motor 48 is sensed in Step 204, and not to perform control in Steps 208 to 214 from then on but wait until the passenger 38 re-restrains the webbing 20. In the same manner, it is also possible not to perform any control after the motor 48 is stopped in Step 108 in FIG. 3.

What is claimed is:

1. A motor-driven seatbelt apparatus for a vehicle comprising:
   a webbing to be restrained around an occupant;
   a motor that winds the webbing; and
   a controller that controls the motor to not wind the webbing when the occupant releases the webbing from a restrained state while the vehicle is traveling at a velocity exceeding a predetermined velocity, said control of said motor to not wind continuing, until said vehicle is traveling at a velocity equal to or less than said predetermined velocity.

2. The motor-driven seatbelt apparatus according to claim 1, wherein the controller controls the motor to wind and store the webbing when the occupant releases the webbing from a restrained state while the vehicle is traveling at the predetermined velocity or lower.

3. The motor-driven seatbelt apparatus according to claim 2, wherein the controller stops the motor when a tension of the webbing increases and the rotation of the motor is locked in the winding operation for storing the webbing.

4. The motor-driven seatbelt apparatus according to claim 3, wherein the controller drives the motor to wind and store the webbing when a predetermined period has elapsed after the motor is stopped.

5. The motor-driven seatbelt apparatus according to claim 3, wherein the controller drives the motor to wind and store the webbing when it is detected that the occupant has left the seat after the motor is stopped.

6. The motor-driven seatbelt apparatus according to claim 1, wherein the controller drives the motor to wind and store the webbing when the velocity of the vehicle is decreased to the predetermined velocity or lower in a case in which the occupant releases the webbing from the restrained state while the vehicle is traveling at a velocity exceeding the predetermined velocity.

7. The motor-driven seatbelt apparatus according to claim 1, wherein the predetermined velocity is 3 kilometers/hr.

8. A motor-driven seatbelt apparatus for a vehicle comprising:
- a webbing to be restrained around an occupant;
- a motor that winds the webbing; and
- a controller that controls the motor to not wind the webbing when the occupant releases the webbing from a restrained state while the vehicle is traveling, said control of said motor to not wind continuing until said vehicle is traveling at a velocity equal to or less than said predetermined velocity.

9. A motor-driven seatbelt apparatus for a vehicle comprising:
- a driver's seat webbing to be restrained around a driver;
- a driver's seat motor that winds the driver's seat webbing;
- a passenger's seat webbing to be restrained around a passenger;
- a passenger's seat motor that winds the passenger's seat webbing; and
- a controller that controls the motor not to wind the driver's seat webbing when the driver releases the driver's seat webbing from a restrained state while the vehicle is traveling at a velocity exceeding a first predetermined velocity, and further controls the motor to not wind the passenger's seat webbing when the passenger releases the passenger's seat webbing from the restrained state while the vehicle is traveling at a velocity exceeding a second predetermined velocity that is set to be equal to or faster than the first predetermined velocity, said control of said driver's seat and passenger's seat motors to not wind continuing until said vehicle is traveling at a velocity equal to or less than said predetermined velocity.

10. A motor-driven seatbelt apparatus for a vehicle comprising:
- a driver's seat webbing to be restrained around a driver;
- a driver's seat motor that winds the driver's seat webbing; and
- a controller that controls the driver's seat motor to not drive so as not to wind and store the driver's seat webbing when the driver releases the driver's seat webbing from a restrained state while the vehicle is traveling at a velocity exceeding zero, said control of said motor to not wind continuing until said vehicle is traveling at a velocity equal to or less than said predetermined velocity.

11. The motor-driven seatbelt apparatus according to claim 10 further comprising:
- a passenger's seat webbing to be restrained around a passenger; and
- a passenger's seat motor that winds the passenger's seat webbing, wherein
- the controller controls the passenger's seat motor to drive and to wind and store the passenger's seat webbing when the passenger releases the passenger's seat webbing from a restrained state while the vehicle is traveling.

* * * * *